(12) United States Patent
Pan et al.

(10) Patent No.: US 12,478,796 B2
(45) Date of Patent: Nov. 25, 2025

(54) MAGNETIC STIMULATION METHOD WITH CONTROLLABLE INDUCED FIELD DIRECTION

(71) Applicant: Harbin Institute of Technology, Harbin (CN)

(72) Inventors: Donghua Pan, Harbin (CN); Jinting Wang, Harbin (CN); Yiding Wang, Harbin (CN); Jiayu Zhai, Harbin (CN); Yanlu Chen, Harbin (CN); Liyi Li, Harbin (CN)

(73) Assignee: Harbin Institute of Technology, Harbin (CN)

( * ) Notice: Subject to any disclaimer, the term of this patent is extended or adjusted under 35 U.S.C. 154(b) by 925 days.

(21) Appl. No.: 17/694,812

(22) Filed: Mar. 15, 2022

(65) Prior Publication Data
US 2023/0128566 A1 Apr. 27, 2023

(30) Foreign Application Priority Data

Oct. 26, 2021 (CN) .......................... 202111249448.3

(51) Int. Cl.
*A61N 2/02* (2006.01)
*A61N 2/00* (2006.01)

(52) U.S. Cl.
CPC ............... *A61N 2/02* (2013.01); *A61N 2/006* (2013.01)

(58) Field of Classification Search
CPC .................................. A61N 2/02; A61N 2/006
See application file for complete search history.

(56) References Cited

U.S. PATENT DOCUMENTS

2007/0260107 A1* 11/2007 Mishelevich .......... A61N 2/004
600/14
2009/0156884 A1* 6/2009 Schneider .............. A61N 2/006
600/13

(Continued)

FOREIGN PATENT DOCUMENTS

CN 107748813 A 3/2018

*Primary Examiner* — Carrie R Dorna
*Assistant Examiner* — Joshua Daryl D Lannu
(74) *Attorney, Agent, or Firm* — IPro, PLLC; Na Xu (57) ABSTRACT

The disclosure discloses a magnetic stimulation method with a controllable induced field direction, and belongs to the technical field of noninvasive neural regulation. The method includes the following steps: S100, determining currents $i_{1j}$, $i_{2j}$, $i_{3j}$, j=1, 2, ..., n required to respectively generate unit vector electric fields at a target point $P_t$, when the currents $i_{1j}$, $i_{2j}$, $i_{3j}$, are respectively applied through a coil j of a magnetic stimulation coil group, n≥3 and n being an integer; S200, decomposing an electric field E required at the target point $P_t$ to three electric field components $E_1$, $E_2$, $E_3$; S300, calculating currents $I_{1j}$, $I_{2j}$, $I_{3j}$ that respectively generate the electric field components $E_1$, $E_2$, $E_3$ at the target point $P_t$, $I_{1j}=E_1 i_{1j}$, $I_{2j}=E_2 i_{2j}$, $I_{3j}=E_3 i_{3j}$; S400, generating the electric field E at the target point $P_t$ by applying a current $I_j=I_{1j}+I_{2j}+I_{3j}=E_1 i_1+E_2 i_2, I_{3j}+E_3 i_3$; through the coil j, j=1, 2, ..., n.

2 Claims, 8 Drawing Sheets

(56) References Cited

U.S. PATENT DOCUMENTS

| | | | |
|---|---|---|---|
| 2010/0113959 A1* | 5/2010 | Pascual-Leone | A61N 2/008 600/13 |
| 2014/0107931 A1* | 4/2014 | Pesola | G01N 37/00 702/19 |
| 2014/0364679 A1* | 12/2014 | Hernandez-Garcia | A61N 2/006 600/13 |
| 2017/0021187 A1* | 1/2017 | Hong | A61N 1/40 |
| 2021/0154488 A1 | 5/2021 | Thyagarajan et al. | |

* cited by examiner

MAGNETIC STIMULATION METHOD WITH CONTROLLABLE INDUCED FIELD DIRECTION

TECHNICAL FIELD

The disclosure relates to a magnetic stimulation method with a controllable induced field direction, and belongs to the technical field of noninvasive neural regulation.

BACKGROUND

Magnetic stimulation is a neuromodulation technology. Its basic principle is to make a pulse current into a coil to generate a magnetic field that can penetrate through the scalp, the skull and other obstacle tissues, induce an electric field in the brain, and then induce an induced current to change membrane potentials of neurons, activate the neurons, and produce a series of physiological effects. Due to the non-invasive and safe characteristics of this technique, it is widely used in routine electrophysiological examinations, treatment of neurological diseases and scientific brain researches.

In the coil topology design of the existing magnetic stimulation method, most of them pay attention to the spatial distribution of the amplitude of the induced electric field, and its focusing degree and penetration depth are studied. However, the effect of magnetic stimulation is not only related to the strength of an induced electric field, but also closely related to a direction in which the induced electric field acts on the neurons.

The mechanism of the magnetic stimulation technology is not clear, and effective stimulation in the deep brain is still difficult. The direction and types of neurons in the deep nuclei of the brain are very complex. Different types of neurons have different sensitivity and activation thresholds to the direction of electric fields. At the same time, controlling the intensity and direction of an induced electric field can improve the validness and selectivity of deep neuron stimulation.

For existing coils, such as 8-shaped coils with the consistent electric field directions at a current convergence part, the direction of the induced electric field is changed by means of in-situ rotation, but this method is not flexible for the control of the direction of the electric field, and the direction can only be changed on a plane. When the position of the 8-shaped coil is changed to achieve a change in a direction of an electric field in a three-dimensional space, the 8-shaped coil will inevitably be moved away from an original stimulation target point, and the intensity of the electric field will decrease rapidly, failing to achieve a stimulation effect of neuron activation. Therefore, new stimulation methods and coil structures are needed to achieve direction-controllable magnetic stimulation.

SUMMARY

The disclosure provides a magnetic stimulation method with a controllable induced field direction, so as to solve the problem that if the position of a coil is changed, the intensity of an electric field will decrease rapidly, failing to achieve a stimulation effect of neuron activation in the prior art.

A magnetic stimulation method with a controllable induced field direction includes the following steps:

S100, calculating currents $i_{1j}$, $i_{2j}$, $i_{3j}$, $j=1, 2, \ldots n$ required to be made to generate a unit-direction vector electric field at a target point $P_t$, the same below;

S200, decomposing a vector electric field E required at the target point to three fundamental vector directions to obtain electric field components $E_1$, $E_2$, $E_3$;

S300, calculating currents that may generate the electric field components $E_1$, $E_2$, $E_3$ at the target point, $I_{1j}=E_1 i_{1j}$, $I_{2j}=E_2 i_{2j}$, $I_{3j}=E_3 i_{3j}$;

S400, superimposing the currents of the three energization modes to obtain a resultant current $I_j=I_{1j}+I_{2j}+I_{3j}=E_1 i_{1j}+E_2 i_{2j}+E_3 i_{3j}$ to be made of each coil of a coil group, that is, generating a required electric field E at the target point for specific directional stimulation.

Further, before S100, the method further includes:

S000, constructing a magnetic stimulation coil group.

Further, in S000 specifically includes the following steps:

S001, constructing a three-dimensional space;

S002, placing the target point $P_t$ in the three-dimensional space; setting q lead wires, the end points of ends of which are intersected, above the target point $P_t$, where all the lead wires form an included angle with an xoy plane and form included angles $\theta_1, \theta_2, \ldots \theta_q$ with the forward direction of the z axis;

S003, closing the other ends of the q lead wires with the intersected end points by line segments or polygonal connecting lead wires to form a magnetic stimulation coil group which has n coils.

Further, in S100, a current is made into the magnetic stimulation coil group by the following energization modes:

in a first energization mode, currents in all the coils are $I_{11}, I_{12}, I_{13}, \ldots, I_{1j}, \ldots, I_{1n}$, thus generating an induced electric field $E_1$;

in a second energization mode, currents in all the coils are $I_{21}, I_{22}, I_{23}, \ldots, I_{2j}, \ldots, I_{2n}$, thus generating an induced electric field $E_2$;

in a third energization mode, currents in all the coils are $I_{31}, I_{32}, I_{33}, \ldots, I_{3j}, \ldots, I_{3n}$, thus generating an induced electric field $E_3$.

Further, in S200, specifically:

the coil group in each energization mode respectively generates combined induced electric fields $E_1(a_1,b_1,c_1)$, $E_2(a_2,b_2,c_2)$, $E_3(a_3,b_3,c_3)$ at the target point $P_t$ below coil intersections; the three induced electric fields are not coplanar, that is, $E_1$, $E_2$, $E_3$ are linearly independent, where $$\begin{vmatrix} a_1 & b_1 & c_1 \\ a_2 & b_2 & c_2 \\ a_3 & b_3 & c_3 \end{vmatrix} \neq 0.$$

Further, in S300, specifically:

obtaining corresponding unit-direction vector electric fields, $e_1=E_1/|E_1|$, $e_2=E_2/|E_2|$, $e_3=E_3/|E_3|$, and generating currents needing to be made into the unit-direction vector electric fields at the target point, $$i_{11}=I_{11}/|E_1|, i_{12}=I_{12}/|E_1|, i_{13}=I_{13}/|E_1|, \ldots, i_{1j}=I_{1j}/|E_1|, \ldots, i_{1n}=I_{1n}/|E_1|;$$

$$i_{21}=I_{21}/|E_2|, i_{22}=I_{21}/|E_2|, i_{23}=I_{23}/|E_2|, \ldots, i_{2j}=I_{2j}/|E_2|, \ldots, i_{2n}=I_{2n}/|E_2|;$$

$$i_{31}=I_{31}/|E_3|, i_{32}=I_{32}/|E_3|, i_{33}=I_{33}/|E_3|, \ldots, i_{3j}=I_{3j}/|E_3|, \ldots, i_{3n}=I_{3n}/|E_3|.$$

Further, in S400, specifically: according to the superposition principle of fields, three directional fundamental vec tor electric fields at the target point are used to combine a unit electric field e in arbitrary direction in a space, $$e=\lambda_1 e_1+\lambda_2 e_2+\lambda_3 e_3,$$

$$0\leq\lambda_i\leq 1$$

correspondingly, the currents in all the coils are also superposed, $$i_1 = \lambda_1 i_{11} + \lambda_2 i_{21} + \lambda_3 i_{31}$$
$$i_2 = \lambda_1 i_{12} + \lambda_2 i_{22} + \lambda_3 i_{32}$$
$$i_3 = \lambda_1 i_{13} + \lambda_2 i_{23} + \lambda_3 i_{33}$$
$$\ldots$$
$$i_j = \lambda_1 i_{1j} + \lambda_2 i_{2j} + \lambda_3 i_{3j}$$
$$\ldots$$
$$i_n = \lambda_1 i_{1n} + \lambda_2 i_{2n} + \lambda_3 i_{3n}$$

a ratio $i_1:i_2:i_3:\ldots:i_j:\ldots:i_n$ of the currents made into the coils in the coil group is adjusted, that is, the direction of the electric field e at the target point is controlled; the sizes $ki_1, ki_2, ki_3, \ldots :ki_j, \ldots :ki_n$ of single currents are overall adjusted, that is, the size ke of the electric field at the target point is adjusted.

The disclosure has the following beneficial effects: The magnetic stimulation method with a controllable induced field direction of the disclosure breaks through the design concept of the existing coil, and can control the direction of the induced electric field at the target point in the three-dimensional space by only changing the current without moving the coil, and then activate, according to an electromagnetic field, neuron mechanism to provide flexible and accurate stimulation with directional characteristics for neuron, so as to provide a means for non-invasive selective neuron stimulation. This helps to improve the accuracy and validness of magnetic stimulation.

BRIEF DESCRIPTION OF FIGURES

FIG. 5A-FIG. 5D illustrate an implementation method of controlling a direction of an induced electric field, where

FIG. 7A-FIG. 7D illustrate electric field distributions on a section when a resultant current is made and a size of a field value of an electric field of a target point, where FIG. 7A is E.

FIG. 8A-FIG. 8E are example diagrams of five magnetic stimulation coil groups, where

DETAILED DESCRIPTION

The technical solutions in the examples of the present disclosure will be clearly and completely described below in conjunction with the accompanying drawings in the examples of the present disclosure. Apparently, the described examples are only a part of the examples of the present disclosure, rather than all the examples. Based on the examples in the present disclosure, all other examples obtained by those of ordinary skill in the art without creative work shall fall within the protection scope of the present disclosure.

Figure 1A:
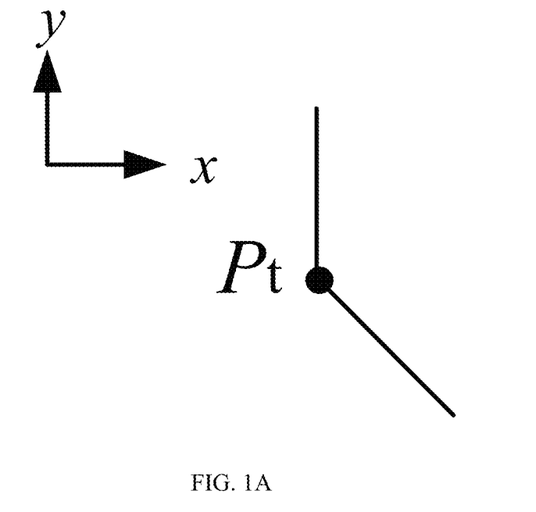
FIG. 1A-FIG. 1C are projections of a coil center structure on an xoy plane.
Figure 1B:
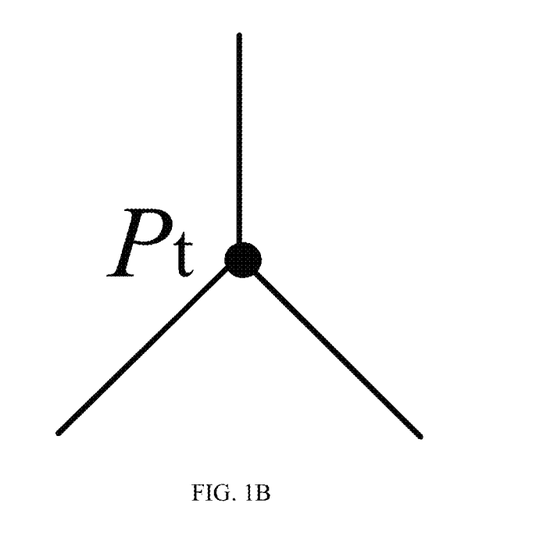
Figure 1C:
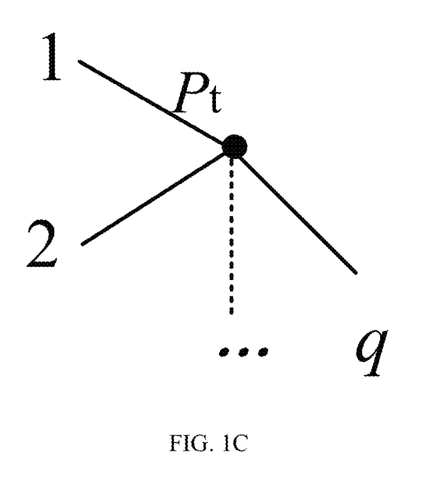

Referring to FIG. 1A-FIG. 1C, the disclosure provides a magnetic stimulation method with a controllable induced field direction, the magnetic stimulation method with the controllable induced field direction including the following steps:

S100, calculating currents $i_{1j}, i_{2j}, i_{3j}$, j=1, 2, . . . n required to be made to generate a unit-direction vector electric field at a target point $P_t$, the same below;

S200, decomposing a vector electric field E required at the target point to three fundamental vector directions to obtain electric field components $E_1$, $E_2$, $E_3$;

S300, calculating currents that may generate the electric field components $E_1$, $E_2$, $E_3$ at the target point, $I_{1j}=E_1 i_{1j}$, $I_{2j}=E_2 i_{2j}$, $I_{3j}=E_3 i_{3j}$;

S400, superimposing the currents of the three energization modes to obtain a resultant current $I_j=I_{1j}+I_{2j}+I_{3j}=E_1 i_{1j}+E_2 i_{2j}+E_3 i_{3j}$ to be made of each coil of a coil group, that is, generating a required electric field E at the target point for specific directional stimulation.

Further, before S100, the method further includes:

S000, constructing a magnetic stimulation coil group.

Further, in S000 specifically includes the following steps:

S001, constructing a three-dimensional space;

S002, placing the target point $P_t$ in the three-dimensional space; setting q lead wires, the end points of ends of which are intersected, above the target point $P_t$, where all the lead wires form an included angle with an xoy plane and form included angles $\theta_1, \theta_2, \ldots \theta_g$ with the forward direction of the z axis;

S003, closing the other ends of the q lead wires with the intersected end points by line segments or polygonal connecting lead wires to form a magnetic stimulation coil group which has n coils.

Specifically, the physical principle of a magnetic intervention technology is Maxwell's equations. A time-varying electromagnetic field generated by a coil pulse current can be regarded as a magnetic quasi-static field. An induced electric field in an air domain has the following relationship with the current:

$$E = -\frac{\partial A}{\partial t}$$

$$A = \frac{\mu_0}{4\pi}\int\frac{Idl}{r}$$

$$E = -\frac{\mu_0}{4\pi}\frac{\partial I}{\partial t}\int\frac{dl}{r}$$

where A is a vector magnetic potential; E is the induced electric field; Idl is a current element; r is a distance from the current element to a point to be determined; and $\mu_0$ is a vacuum permeability.

It can be known from the above formula that the induced electric field is parallel to the current element Idl, and has an opposite direction to that of the current element Idl. Based on the relationship between the current and the direction of an electric field and the superposition principle of fields, it is easy to construct a coil group structure that is capable of controlling arbitrary direction of an electric field in a space above a target point $P_t$ through intersecting currents. In order to obtain an electric field in arbitrary direction in a three-dimensional space, three non-coplanar fundamental vectors are required, which provide electric field components in the x, y, and z directions of the Cartesian coordinate system.

Further, in S100, a current is made into the magnetic stimulation coil group by the following energization modes:

in a first energization mode, currents in all the coils are $I_{11}, I_{12}, I_{13}, \ldots, I_{1j}, \ldots, I_{1n}$, thus generating an induced electric field $E_1$;

in a second energization mode, currents in all the coils are $I_{21}, I_{22}, I_{23}, \ldots, I_{2j}, \ldots, I_{2n}$, thus generating an induced electric field $E_2$;

in a third energization mode, currents in all the coils are $I_{31}, I_{32}, I_{33}, \ldots, I_{3j}, \ldots, I_{3n}$, thus generating an induced electric field $E_3$.

Specifically, an electric field in arbitrary direction is constructed on a two-dimensional plane. FIG. 1 shows a projection of a center structure of a coil group on an xoy plane. An intersection of lead wires is located directly above the target point. The lead wire structures alone or that overlap into a straight line cannot bring electric field components in the x and y directions, and it is impossible to construct, on the plane, a coil structure that controls the direction of the electric field by a current. The lead wire structures that radiate 2, 3, . . . , q lead wires from the center of the target point can bring components in the x and y directions on the plane, thus combining an electric field in arbitrary direction in the xoy plane.

Figure 2:
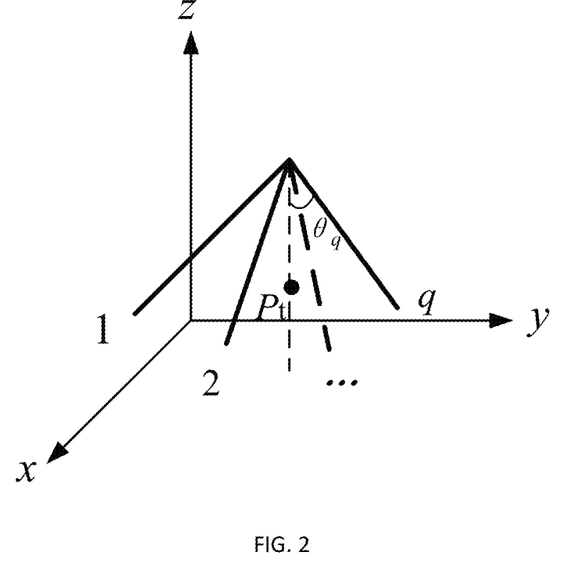
FIG. 2 is a diagram of a coil center structure, which is composed of q wires, q=1, 2, 3, . . . n.

In order to enable the coil to be able to generate an electric field component in the z direction for the electric field in arbitrary direction in the three-dimensional space, the lead wires need to form a certain included angle with the xoy plane. Therefore, the coil structure is a three-dimensional structure rather than a planar structure. As shown in FIG. 2, included angles between the lead wires and the forward direction of the z axis are $\theta_1, \theta_2, \ldots \theta_q$, respectively.

The lead wires are closed with polygonal connecting line segments, so that a coil group structure with a controllable induced field direction is obtained. The number q of the intersecting lead wires above the target point corresponds to the number n of coil groups.

Figure 3:
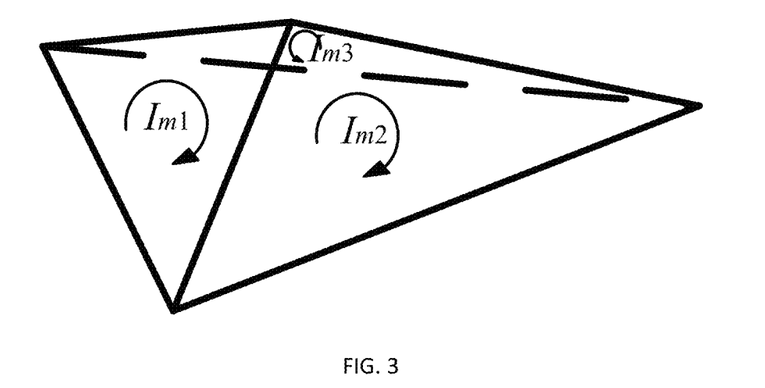
FIG. 3 is an example diagram of making a current.

The implementation principle of the magnetic stimulation method with the controllable induced field direction is as follows: three energization modes are used to make a current into the coil groups. In a first energization mode, the currents in all coils are $I_{11}, I_{12}, I_{13}, \ldots, I_{1j}, \ldots, I_{1n}$; in a second energization mode, the currents in all the coils are $I_{21}, I_{22}, I_{23}, \ldots, I_{2j}, \ldots, I_{2n}$; in a third energization mode, the currents in all the coils is $I_{31}, I_{32}, I_{33}, \ldots, I_{3j}, \ldots, I_{3n}$ (FIG. 3 is taken as an example, m=1, 2, 3 represent the energization modes).

Further, in S200, specifically:

the coil group in each energization mode respectively generates combined induced electric fields $E_1(a_1,b_1,c_1)$, $E_2(a_2,b_2,c_2)$, $E_3(a_3,b_3,c_3)$ at the target point $P_t$ below coil intersections; the three induced electric fields are not coplanar, that is, $E_1, E_2, E_3$ are linearly independent, where $$\begin{vmatrix} a_1 & b_1 & c_1 \\ a_2 & b_2 & c_2 \\ a_3 & b_3 & c_3 \end{vmatrix} \neq 0.$$

Further, in S300, specifically:

obtaining corresponding unit-direction vector electric fields, $e_1=E_1/|E_1|$, $e_2=E_2/|E_2|$, $e_3=E_3/|E_3|$, and generating currents needing to be made into the unit-direction vector electric fields at the target point, $i_{11}=I_{11}/|E_1|, i_{12}=I_{12}/|E_1|, i_{13}=I_{13}/|E_1|, \ldots, i_{1j}=I_{1j}/|E_1|, \ldots, i_{1n}=I_{1n}/|E_1|$;

$i_{21}=I_{21}/|E_2|, i_{22}=I_{21}/|E_2|, i_{23}=I_{23}/|E_2|, \ldots, i_{2j}=I_{2j}/|E_2|, \ldots, i_{2n}=I_{2n}/|E_2|$;

$i_{31}=I_{31}/|E_3|, i_{32}=I_{32}/|E_3|, i_{33}=I_{33}/|E_3|, \ldots, i_{3j}=I_{3j}/|E_3|, \ldots, i_{3n}=I_{3n}/|E_3|$.

Further, in S400, specifically: according to the superposition principle of fields, three directional fundamental vector electric fields at the target point are used to combine a unit electric field e in arbitrary direction in a space, $e=\lambda_1 e_1+\lambda_2 e_2+\lambda_3 e_3$, $0 \leq \lambda_i \leq 1$ correspondingly, the currents in all the coils are also superposed, $i_1 = \lambda_1 i_{11} + \lambda_2 i_{21} + \lambda_3 i_{31}$ $i_2 = \lambda_1 i_{12} + \lambda_2 i_{22} + \lambda_3 i_{32}$ $i_3 = \lambda_1 i_{13} + \lambda_2 i_{23} + \lambda_3 i_{33}$

...

$i_j = \lambda_1 i_{1j} + \lambda_2 i_{2j} + \lambda_3 i_{3j}$

...

$i_n = \lambda_1 i_{1n} + \lambda_2 i_{2n} + \lambda_3 i_{3n}$ a ratio $i_1:i_2:i_3: \ldots i_j: \ldots :i_n$ of the currents made into the coils in the coil group is adjusted, that is, the direction of the electric field e at the target point is controlled; the sizes $ki_1$, $ki_2$, $ki_3, \ldots :ki_j, \ldots :ki_n$ of single currents are overall adjusted, that is, the size ke of the electric field at the target point is adjusted.

Figure 4:
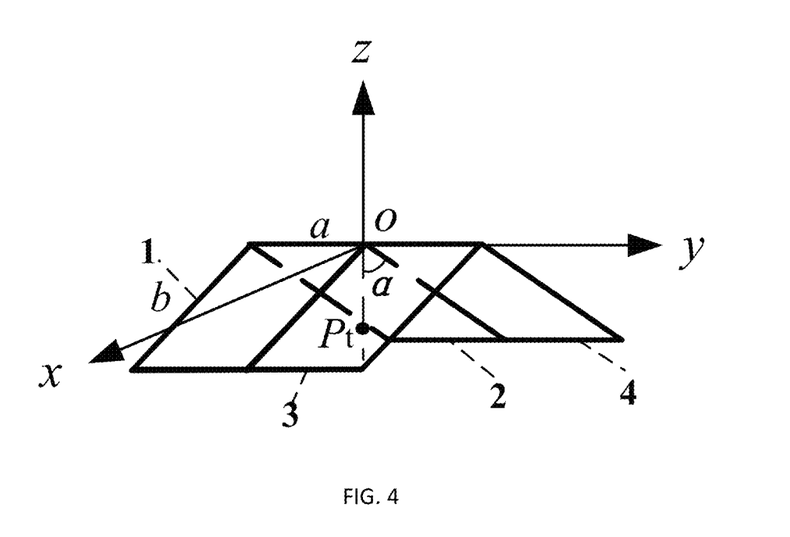
FIG. 4 illustrates magnetic stimulation coil groups in four rectangular forms.
Figure 5A:
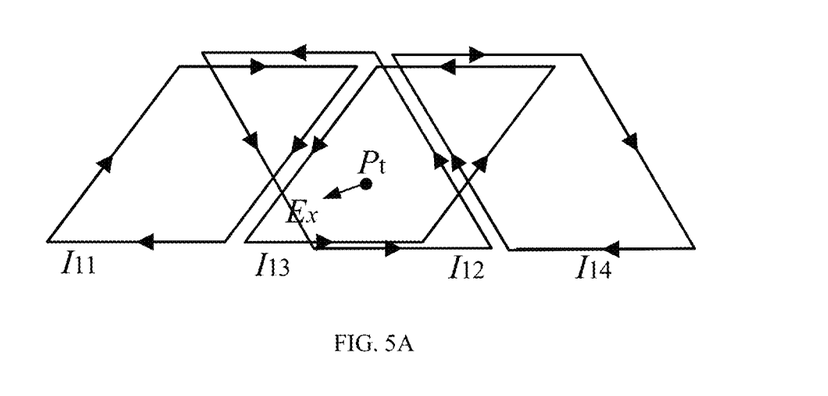
FIG. 5A is an energization mode 1.
Figure 5B:
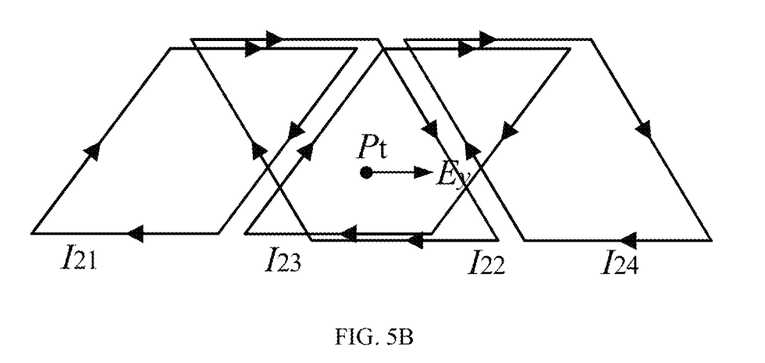
FIG. 5B is an energization mode 2.
Figure 5C:
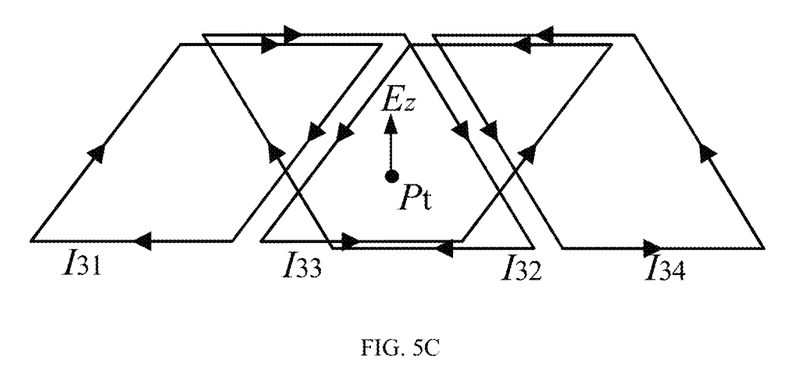
FIG. 5C is an energization mode 3.
Figure 5D:
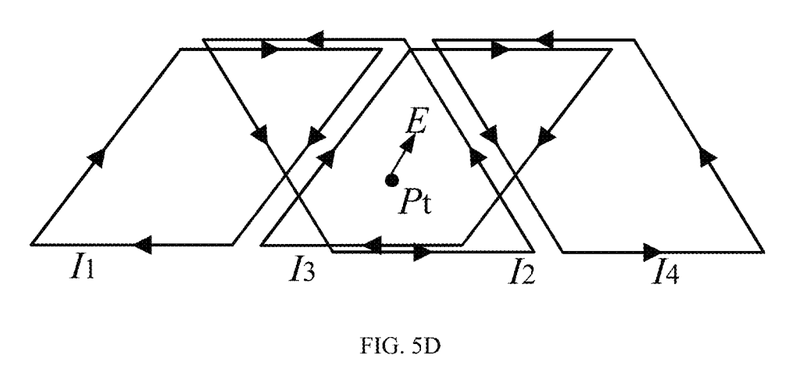
FIG. 5D is an energization mode 4.

As shown in FIG. 8, the coil group can have various forms. A quadrilateral form including four coils in an air domain is taken as an example to describe the implementation of the magnetic stimulation method for controlling the direction of an induced electric field. The schematic diagram of a coil group structure is shown in FIG. 4. The coil group is composed of 4 identical rectangles of a "book-shaped" structure, and edge lengths of the rectangles are a and b. Coils 1 and 2 are coplanar; coils 3 and 4 are coplanar and two coplanar coils form a wing. An included angle between the plane of each wing coil and a negative direction of the z axis is $\alpha$. The coil group is of a symmetrical structure, that is, an included angle between two wings is $2\alpha$.

In energization mode 1, the currents made into the coil group are $I_{11}, I_{12}, I_{13}, I_{14}$, and the magnitudes of the currents are equal: $I_{11}=I_{12}=I_{13}=I_{14}$; the current directions are clockwise, clockwise, counterclockwise, and counterclockwise when seen from the forward direction of the z axis. In energization modes 2 and 3, the magnitudes of the currents made into the coil group are also the same: $I_{21}=I_{22}=I_{23}=I_{24}$, $I_{31}=I_{32}=I_{33}=I_{34}$, and the current directions are as shown in FIG. 5.

Figure 6:
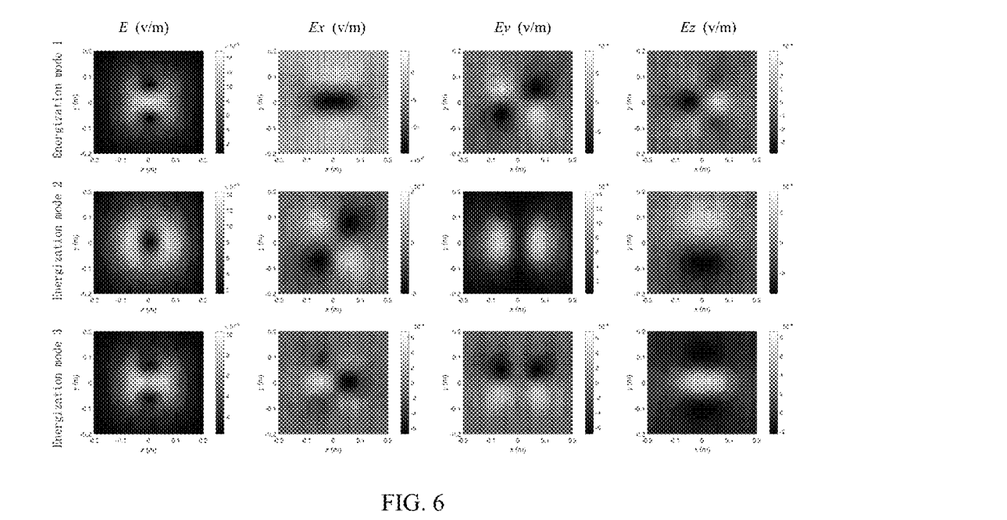
FIG. 6 is a diagram of electric field distribution on a section under various energization modes.
Figure 7A:
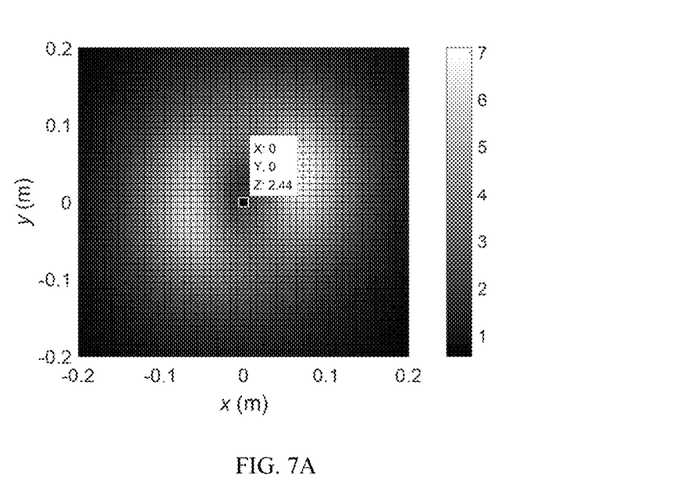
Figure 7B:
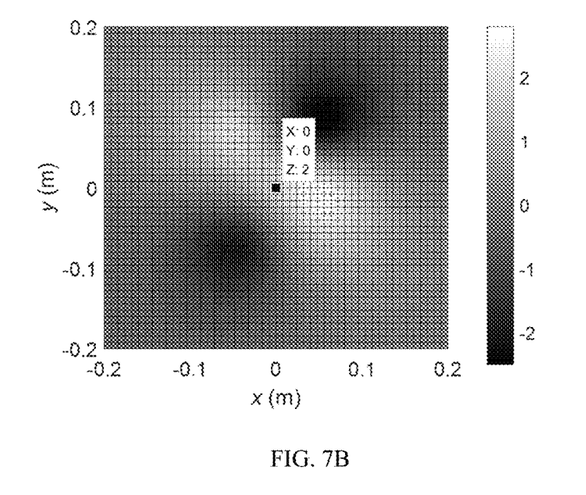
FIG. 7B is an x-directional component of E.
Figure 7C:
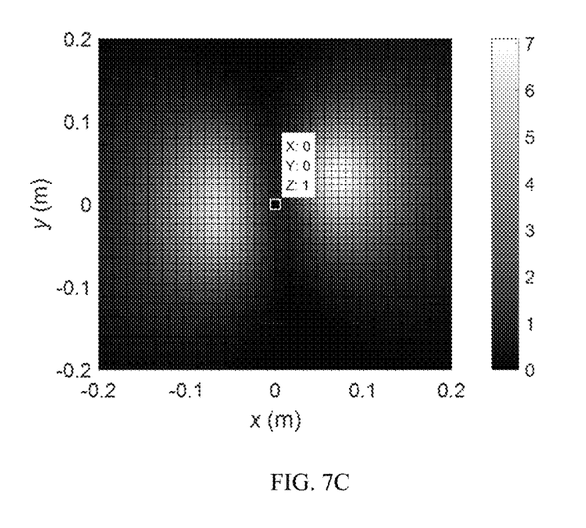
FIG. 7C is a y-directional component of E.
Figure 7D:
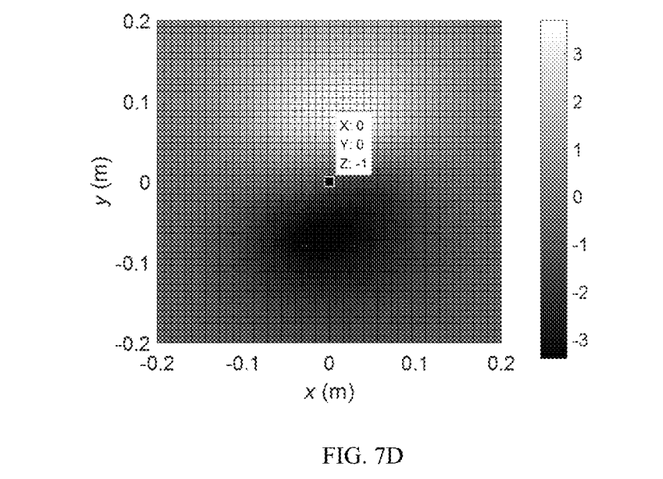
FIG. 7D is a z-directional component of E.
Figure 8A:
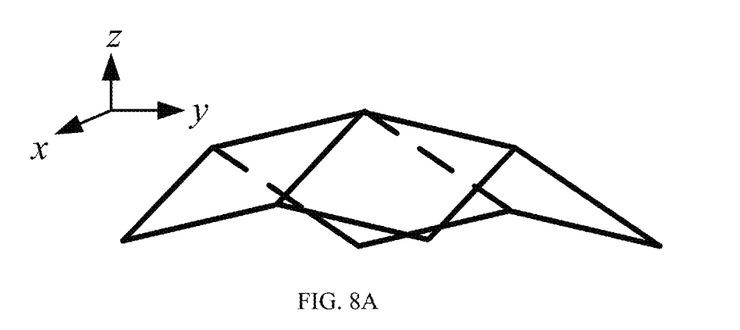
FIG. 8A illustrates four quadrilateral forms.
Figure 8B:
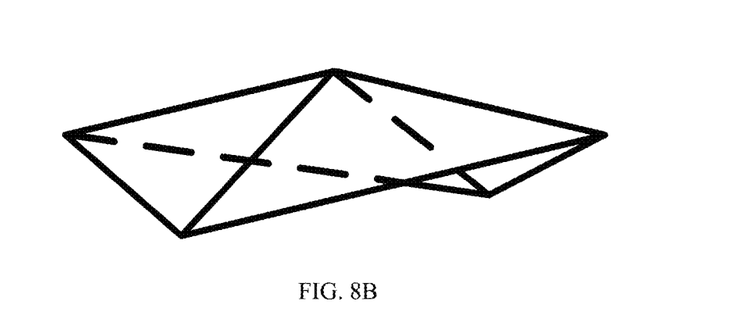
FIG. 8B illustrates four triangular forms.
Figure 8C:
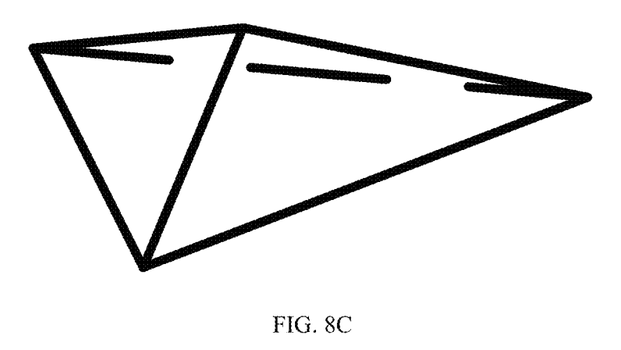
FIG. 8C illustrates three triangular forms.
Figure 8D:
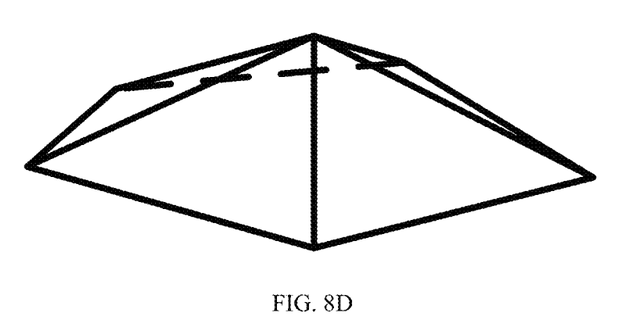
FIG. 8D illustrates five triangular forms.
Figure 8E:
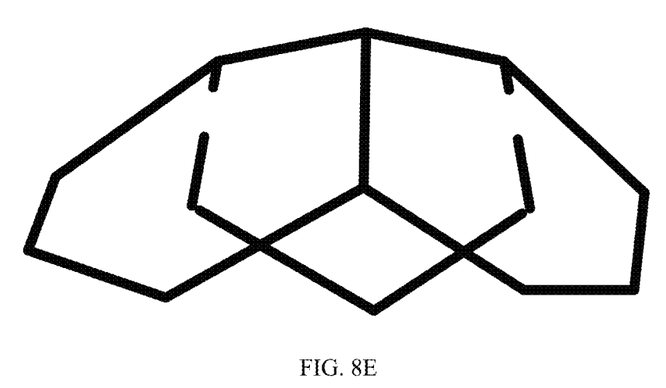
FIG. 8E illustrates three hexagonal forms.

In the air domain, the direction of the induced electric field is opposite to that of the current. FIG. 6 shows an electric field distribution on a certain section below the coils under the three energization modes. The magnitude of the current is 1 A; the frequency is 2500 Hz; the side lengths a and b are both 70 mm; the included angle is 60°. Table 1 shows electric field values at the target point. The three energization modes only bring electric fields in the x, y, and z directions at the target point.

TABLE 1

The induced electric field values of the target point (0, 0, −0.08) under all the energization modes

| Energization mode | $I_{m1}, I_{m2}, I_{m3}, I_{m4}$ (A) | $E_x$ (V/m) | $E_y$ (V/m) | $E_z$ (V/m) |
|---|---|---|---|---|
| 1 | 1, 1, −1, −1 | −1.50 × 10⁻³ | 0 | 0 |
| 2 | 1, −1, 1, −1 | 0 | 2.44 × 10⁻⁴ | 0 |
| 3 | 1, −1, −1, 1 | 0 | 0 | 8.61 × 10⁻⁴ |

Note: m=1, 2, 3 are the energization modes; the current is clockwise positive and counterclockwise negative when seen from the forward direction of the z axis, and the same below.

Therefore, the current required to generate a unit fundamental vector electric field at the target can be calculated, as shown in Table 2.

TABLE 2

Current required to generate a unit fundamental vector electric field at the target point (0, 0, −0.08)

| Energization mode | $e_x$ (V/m) | $e_y$ (V/m) | $e_z$ (V/m) | $i_{m1}, i_{m2}, i_{m3}, i_{m4}$ (A) |
|---|---|---|---|---|
| 1 | 1 | 0 | 0 | −0.67 × 10³, −0.67 × 10³, 0.67 × 10³, 0.67 × 10³ |
| 2 | 0 | 1 | 0 | 4.10 × 10³, −4.10 × 10³, 4.10 × 10³, −4.10 × 10³ |
| 3 | 0 | 0 | 1 | 1.16 × 10³, −1.16 × 10³, −1.16 × 10³, 1.16 × 10³ |

A vector electric field E (2, 1, −1) V/m generated at the target point is taken as an example. Its components in a fundamental vector direction are $E_1=2$, $E_2=1$, $E_3=-1$, $I_j=2i_{1j}+i_{2j}-i_{3j}$ (j=1, 2, 3, 4); a resultant current needing to be made to the coil group is $(I_1, I_2, I_3, I_4)=(1.61\times10^3, -4.27\times10^3, 6.59\times10^3, -3.93\times10^3)$ A.

FIG. 7A~D shows an electric field distribution of a section including a target point when a resultant current is made. An electric field value generated by the target point (0, 0, −0.08) is consistent with an expected value.

In a computational domain with a complex medium and a complex boundary, a finite element calculation method can be used to calculate an induced electric field, or actual measurement can be carried out to calibrate a fundamental vector of an electric field and a current made into it.

The above implementation examples are only used to help understand the method of the disclosure and its core idea. For those skilled in the art, according to the idea of the disclosure, several improvements and modifications can be made in the specific implementation and application scope. These improvements and modifications shall also fall within the protection scope of the disclosure.

What is claimed is:

1. A method, comprising:
   S100, determining currents $i_{1j}$, $i_{2j}$, $i_{3j}$, j=1, 2, . . . n required to respectively generate unit vector electric fields at a target point $P_t$, when the currents $i_{1j}$, $i_{2j}$, $i_{3j}$, are respectively applied through a coil j of a magnetic stimulation coil group, n≥3 and n being an integer;
   S200, decomposing an electric field E required at the target point $P_t$ to three electric field components $E_1$, $E_2$, $E_3$;
   S300, calculating currents $I_{1j}$, $I_{2j}$, $I_{3j}$ that respectively generate the electric field components $E_1$, $E_2$, $E_3$ at the target point $P_t$, $I_{1j}=E_1i_{1j}$, $I_{2j}=E_2i_{2j}$, $I_{3j}=E_3i_{3j}$;
   S400, generating the electric field E at the target point $P_t$ by applying a current $I_j=I_{1j}+I_{2j}+I_{3j}=E_1i_{1j}+E_2i_{2j}+E_3i_{3j}$ through the coil j, j=1, 2, . . . , n.

2. The method according to claim 1, wherein the electric field components $E_1$, $E_2$, $E_3$ are mutually orthogonal.

* * * * *